June 1, 1954     E. S. POMYKALA     2,679,724
EXHAUST GAS PURIFIER
Filed Jan. 16, 1950
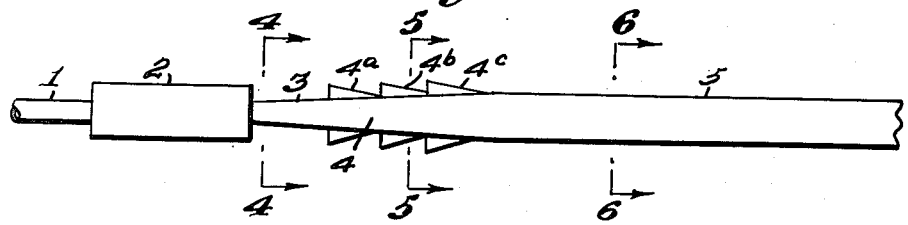
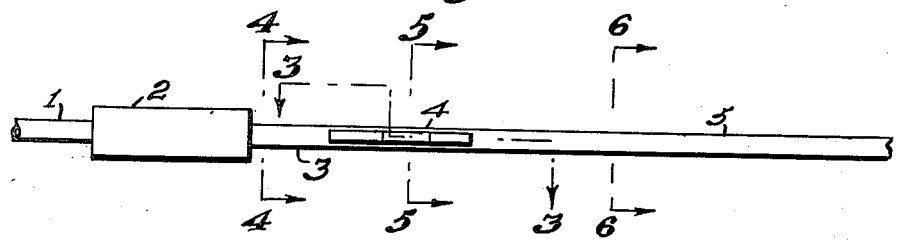
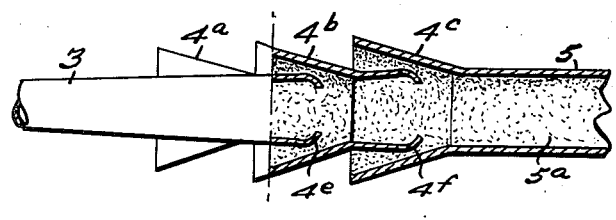
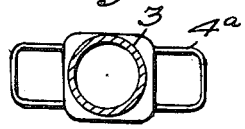 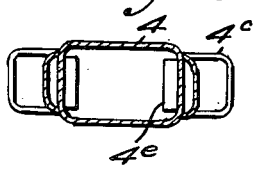 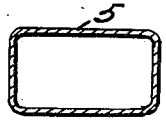
INVENTOR.
Edmund S. Pomykala
BY Henry C. Parker
Attorney Patented June 1, 1954

2,679,724

UNITED STATES PATENT OFFICE 2,679,724

EXHAUST GAS PURIFIER

Edmund S. Pomykala, Mobile, Ala.

Application January 16, 1950, Serial No. 138,831

2 Claims. (Cl. 60—30)

This invention relates to improvements in engine exhaust gas diffusers and purifiers, particularly to exhaust gas diffusers for automobiles and buses. In my patent application Serial No. 114,833, now abandoned, a method was shown for cooling and diffusing the exhaust gases. Normally this would be sufficient where the carburetor was set for maximum efficiency and the ratio of carbon monoxide to the total of exhaust fumes was small, say one or two percent. Unfortunately this is not always the case because of imperfect combustion, partially caused by poor setting of carburetor but also because the combustion air itself is variable and impure. The main city streets at certain busy hours may contain air having a considerable proportion of carbon dioxide. This air when taken into the engines and burned with the fuel in the cylinders gives imperfect combustion and may result in proportions of carbon monoxide in exhaust gases running as high as from about 6 to 12 per cent by weight. Such exhaust gases even after they are diffused in city street atmosphere are dangerous to pedestrians and occupants of city buses.

The present invention provides an exhaust gas purifier which eliminates the presence of carbon monoxide in exhaust gas by converting this to carbon dioxide through catalytic reaction with air which is mixed with the exhaust gases. Mixture takes place in an elongated unobstructed plenum chamber through which the exhaust gases pass and into which air is drawn by means of flaring air inlet nozzles, the plenum chamber being constructed from a sheet of clad metal having a base of steel or other metal and a cladding of a metal or alloy which upon being oxidized produces a catalytic action on the mixture of air and the carbon monoxide of the exhaust gases. The cladding metal is on the inside of the plenum chamber and has an oxidized surface.

My invention can be explained in greater detail by reference to the accompanying drawing which shows, more or less diagrammatically, a preferred embodiment of this invention. In this showing:

Figure 1 is a plan view of the purifier.

Figure 2 is a side elevation.

Figure 3 is a plan view partly in section and on an enlarged scale of the main part of the mixing chamber taken on lines 3—3 of Fig. 2.

Figure 4 is a sectional view on a similar scale taken on lines 4—4 in Figs. 1 and 2.

Figure 5 is a sectional view on a similar scale taken on lines 5—5 in Figs. 1 and 2.

Figure 6 is a sectional view on a similar scale of the exhaust tube taken on lines 6—6 in Figs. 1 and 2.

Figure 7 is a typical section on a still larger scale of the sheet metal composing the purifier using clad metal construction.

In all views similar designating numerals refer to similar parts.

Main exhaust gas pipe 1, discharges to any standard muffler 2, whence the gases discharge to a transition section of sheet metal 3, of the purifier diffuser. From here the gases flow to the mixing or plenum chamber 4. At this point outside air is taken in through a series of converging nozzles 4a, 4b, 4c, one set on each side of the mixing chamber. Due to the angular flow of the air, the divergence of the main mixing chamber and the inward curving vanes 4e, and 4f (Fig. 3), turbulent and whirling motion is imparted to the mixed air and exhaust gases. This turbulence is further continued and augmented in the tube extension 5 lined with oxide coating 5a. Typical preferred sheet metal construction of the purifier is shown on an enlarged scale in Fig. 7 wherein 5a is metallic oxide, 5b is clad metal preferably of manganese and copper alloy and 5c is a base metal.

The clad metal may contain substantially equal percentages of manganese and copper. A more general formula for its composition is

|           | Per cent |
|-----------|----------|
| Manganese | 40 to 60 |
| Copper    | 40 to 50 |
| Cobalt    | 0 to 2   |
| Nickel    | 0 to 2   |
| Silver    | 0 to 0.5 |
| Iron      | 0 to 10  |

The base of the clad metal may be of fairly soft steel or other suitable metal with the base constituting about nine tenths of the total thickness and the cladding metal one tenth, for example, the base and the cladding metal being bonded together and with the clad metal being on the inside of the purifier. The oxide coating on the cladding metal can be produced by the use of a suitable oxidizing agent, such as potassium chlorate, or by using a highly oxidizing flame for an oxy-acetylene torch, or even by merely heating the clad metal sheets before fabrication while exposing the cladding metal to an atmosphere containing a high oxygen concentration.

Since carbon monoxide is fairly inactive at ordinary temperatures it is essential to obtain intimate blending of the exhaust gases and the air drawn in by the air intake nozzles. This is obtained in the construction shown by the tongues of metal which are cut from the lateral sides of the plenum chamber and which are bent inwardly to make air inlets and by the flaring air intake nozzles which communicate with the air inlets. This construction produces turbulence in the plenum chamber which, as shown in the drawing, is flat on its top and bottom and expands laterally towards its exit.

The turbulent flow of the mixed air and exhaust gases has several desirable characteristics. In gases fairly free of carbon monoxide, the mixture is cooled very efficiently. In gases that contain a considerable proportion of carbon monoxide, the mixing is very intimate and the molecules of oxygen and carbon monoxide strike more often inducing chemical reaction. This of course is promoted by contact with the large metallic oxide contact surface where whirling motion of the gases present new molecules to the oxide to catalyze the oxidation of carbon monoxide.

Having described the general features of the purifier and its operation, it is believed that those skilled in the art may make various changes in details without departing from the spirit of this invention or the scope of the appended claims.

I claim:

1. An exhaust gas purifier adapted to be attached to the exhausts of automobiles and the like, which comprises in combination an elongated plenum tube which is unobstructed and flat on its top and bottom but which expands laterally towards its exit, openings cut into the lateral walls of the plenum tube leaving tongues of metal which are bent inwardly to produce turbulence, a plurality of flaring air inlet nozzles mounted at the inlet end of said plenum tube on opposite sides thereof and communicating with said openings; said plenum tube being constructed from a sheet of clad metal having a base of steel and a cladding of manganese-copper alloy, the cladding metal being on the inside and having an oxidized surface.

2. The exhaust gas purifier of claim 1 wherein the manganese-copper alloy contains substantially equal parts of manganese and copper.

References Cited in the file of this patent

UNITED STATES PATENTS

| Number | Name | Date |
|---|---|---|
| 1,555,578 | Howe | Sept. 29, 1925 |
| 1,756,897 | Bilsky | Apr. 29, 1930 |
| 1,813,189 | Moore | July 7, 1931 |
| 1,893,372 | Kryzanowsky | Jan. 3, 1933 |
| 1,903,803 | Barker | Apr. 18, 1933 |
| 1,934,795 | Frazer | Nov. 14, 1933 |
| 1,953,120 | Miller | Apr. 3, 1934 |
| 2,025,140 | Wenzel | Dec. 24, 1935 |

FOREIGN PATENTS

| Number | Country | Date |
|---|---|---|
| 16,873 | Great Britain | July 15, 1910 |
| 552,142 | France | Jan. 17, 1923 |
| 631,736 | France | Sept. 20, 1927 |

OTHER REFERENCES

"A List of Alloys," by Wm. Campbell, 1932. Published by American Society for Testing Materials (pages 33-34).